United States Patent [19]

Naylor

[11] 4,297,112

[45] Oct. 27, 1981

[54] DEODORIZATION OF EDIBLE OILS

[75] Inventor: Leonard Naylor, Hull, England

[73] Assignee: Simon-Rosedowns Limited, Hull, England

[21] Appl. No.: 95,359

[22] Filed: Nov. 19, 1979

[30] Foreign Application Priority Data

Dec. 1, 1978 [GB] United Kingdom ............... 46896/78

[51] Int. Cl.³ .............................................. B01D 53/00

[52] U.S. Cl. ........................................ 55/195; 55/198; 55/208

[58] Field of Search .................. 55/195, 198, 208, 200

[56] References Cited

U.S. PATENT DOCUMENTS

| | | | |
|---|---|---|---|
| 1,907,050 | 5/1933 | Elliott | 55/198 X |
| 2,078,288 | 4/1937 | Sherman | 55/198 X |
| 2,388,344 | 11/1945 | Sebala | 55/198 X |
| 3,693,322 | 9/1972 | Lieebraay | 55/198 X |
| 3,999,966 | 12/1976 | Naylor | 55/198 X |

*Primary Examiner*—John Adee

*Attorney, Agent, or Firm*—Norris & Bateman

[57] ABSTRACT

A semi-continuous deodorizer for the deodorization of edible oils, comprising a vessel (10) divided into three zones (A,B,C), means for collecting oil to be deodorized in the first zone (A) and for receiving deodorized oil from the second zone (B), in the third zone (C), means for passing oil continuously to the first zone via a heat exchanger (15) where it is pre-heated by heat exchange with oil continuously withdrawn from the third zone, and an oil heater (18) for heating the oil to full process temperatures by circulating the oil through the oil heater and through said first zone making use of the gas lift principle with steam as the injected gas being introduced at (28) into the base of the oil heater.

9 Claims, 2 Drawing Figures

DEODORIZATION OF EDIBLE OILS

This invention relates to the deodorisation of edible oils by a semi-continuous process wherein the oil is treated in a succession of relatively small batches.

The process of deodorisation of an edible oil comprises its treatment at high temperature and reduced pressure with a stripping gas. Typically oils are deodorised at temperatures around 250° C. and at a pressure of 1 to 5 torr using steam as the stripping gas. The oils are customarily heated by means of coils or heat exchange surfaces immersed therein.

In order to avoid degradation of the oil with the resultant production of off flavours, dark colours or polymers the temperature of the heating surfaces must be limited and the formation of hot spots where the oil is not in motion must be avoided. In conventional deodorisers the heating coils are kept submerged in oil at all times when they are hot. The heating means is turned off whilst the vessel is filled when drops of oil could splash onto the heat exchanger and it is turned off before the vessel is emptied to avoid forming a hot film of oil on the exposed heat exchange surface. It is also standard practice to introduce stripping steam into the oil while it is being heated to fulfil the following functions:

(a) It keeps the oil in movement over the heat exchange surfaces thus promoting heat exchange and avoiding hot spots.
(b) It strips traces of dissolved oxygen from the oil before the oil becomes hot enough to react with the oxygen to give off-flavours.
(c) It removes off-flavours from the oil as they are formed.
(d) In oils which have not been completely neutralised it strips off fatty acids to give a substantially neutral oil.

A semi-continuous deodoriser in which oil to be deodorised is continuously pre-heated by heat exchange with oil which has been deodorised is known, but the further heating of such oil to full processing temperatures presents difficult problems which we have solved by use of a gas recirculation heat exchanger.

According to the present invention there is provided a semi-continuous deodoriser comprising a vessel divided into three zones, means for collecting oil to be deodorised in the first zone, means for deodorising oil in the second zone and means for receiving and holding deodorised oil from the second zone in the third zone, means for passing oil continuously to the first zone and withdrawing oil continuously from the third zone, means for preheating the oil fed to the first zone by heat exchange with oil from the third zone, means for heating the oil to full process temperatures, and means for recirculating the oil through said heating means and through said first zone, said recirculating means employing the gas-lift principle.

The invention will be further apparent from the following description with reference to the figures of the accompanying drawings which show by way of example only one form of deodorising plant embodying the invention.

Figure 1:
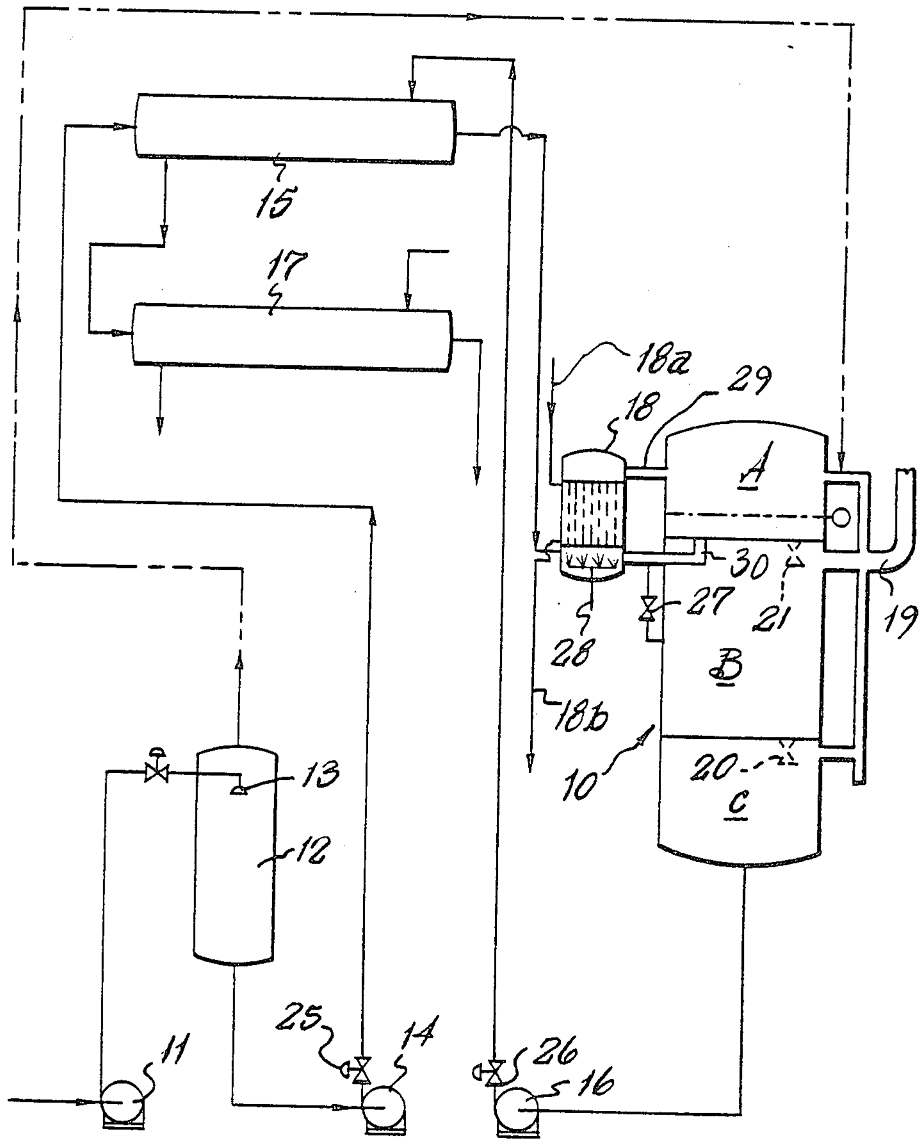
FIG. 1 shows a flow diagram of the plant.
Figure 2:
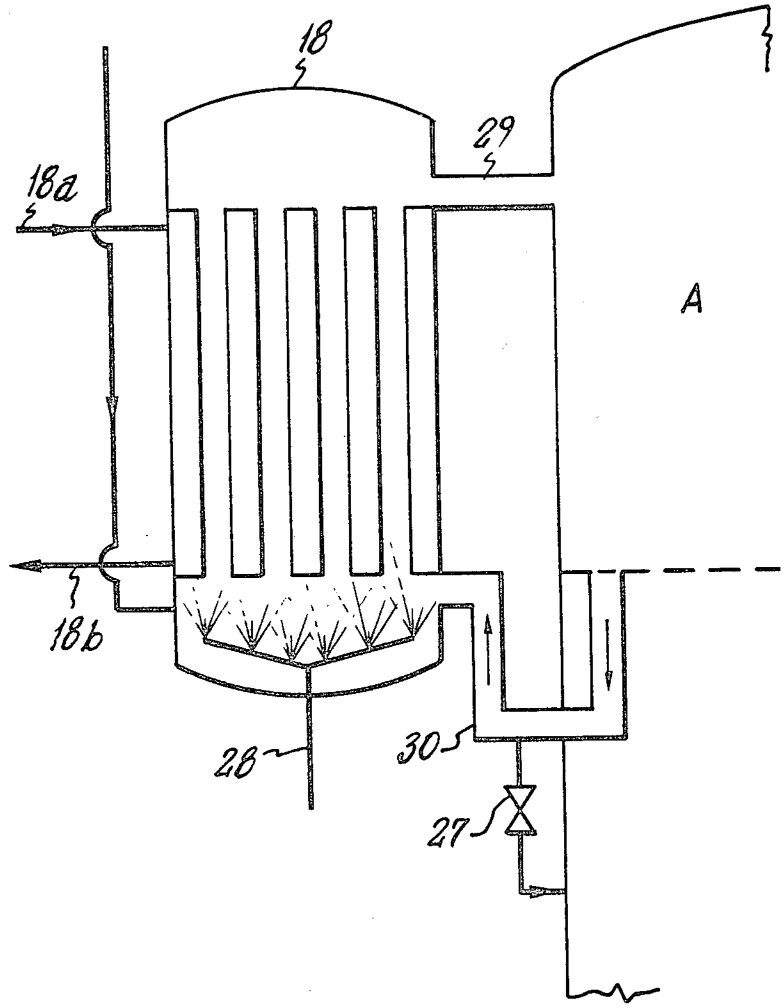
FIG. 2 shows a cross-section through the gas recirculation heat exchanger of the plant of FIG. 1 and on an enlarged scale.

Referring now to the drawings, it will be seen that the plant includes a deodoriser which is comprised by a vessel 10 divided horizontally into three vertically superimposed zones A, B and C.

Each of the three zones A, B and C may be in the form of a single compartment, as here, or may be divided into several sections if desired.

The upper zone A serves for the collection of a batch of oil to be deodorised in the intermediate zone B whilst the lower zone C serves to hold a batch of deodorised oil which is to be cooled.

Oil to be processed is pumped into the plant by a charge pump 11 which passes it to a deaerator 12 by way of a spray nozzle 13. The deaerator 12 is under vacuum and dissolved air and water thus flash off. The flow of oil into the deaerator 12 is controlled by level-sensing means (not shown) whereby a constant level of oil is maintained in the deaerator 12. Oil is pumped by means of a pump 14 from the base of the deaerator 12 at a controlled constant rate (selected to give a deodorisation time suitable for the oil being processed) through an oil to oil counter-current heat exchanger 15 where it is heated by heat exchange with hot deodorised oil which is pumped by a deodoriser discharge pump 16 from the zone C through the heat exchanger 15 for subsequent passage through a water cooled heat exchanger 17 to storage.

The heat exchange surfaces in the heat exchanger 15 cannot be at a higher temperature than the oil leaving the deodoriser, and in order to get good heat exchange, flow velocity of the oil over the surface is kept high. The result of this is that degradation of the oil is very slight because the oil is subjected to elevated temperatures for a short time and the temperatures in question are not high. It is thus possible to dispense with the use of stripping steam up to this point and to use a conventional heat exchanger, for example a shell and tube or plate type.

The pre-heated oil from the heat exchanger 15 is passed to the base of an oil heater 18 in which it is heated to the full deodorising temperature by heat exchange with a suitable high temperature medium such as diphenyl/diphenyl oxide vapour for example circulated through the heater 18 by lines 18*a* and 18*b*.

A small quantity of steam is introduced through a line 28 to the base of the heater 18 to cause oil in the heat exchange tubes to be recirculated rapidly, using the gas-lift principle, around a circuit comprising the heater 18, zone A of the deodoriser and connecting ducts 29 and 30, thus preventing the generation of hot spots which can cause the oil to burn. Such steam also serves to remove any last traces of dissolved oxygen which can, at high temperatures, cause rapid deterioration of the oil.

The oil recirculates through the heater 18 with stripping steam being introduced all the time the oil is being heated and providing the motive force for the oil recirculation. The oil heater 18 can be of relatively small area because it does not have to heat the oil to full deodoriser temperature in a single pass. In this example the oil heater 18 is represented as a shell and tube heat exchanger with oil on the tube side but any convenient heat exchanger to which the gas-lift principle can be applied could be used.

Consider the situation when a charge of oil in zone A has just emptied into zone B. Warm oil from the heat exchanger 15 flows at a constant rate into the base of the oil heater 18 (although it could equally well flow into zone A). The level in zone A is at its lowest level but under the action of the live steam introduced into the base of the oil heater 18 a vigorously agitated mixture of steam and oil enters the bottom of the heater tubes. In the tubes the steam expands as it is heated and the pressure is reduced and a foam of oil and steam passes very rapidly up the tubes. This mixture enters zone A at a high level when the oil disentrains and falls to the bottom of the zone A and the motive steam together with any volatiles stripped off pass into the vacuum system described below. The partially heated oil collecting in zone A passes through duct 30 to the base of the oil heater 18 where it is mixed with further warm oil from the heat recovery heat exchanger and recirculated up the heater tubes being heated in the presence of motive steam to a higher temperature for return to zone A.

It can be seen that a batch of oil will collect in zone A which has only been heated under conditions where hot spots cannot form and in the presence of steam to take away any volatiles liberated. The gas-lift principle used for recirculation is self-regulating and will continue to operate over a range of changing oil levels in zone A.

The quantity of steam used for recirculation under deodoriser conditions is very small because under these conditions a given weight occupies approximately 300 times the volume it would occupy under the more normal conditions of 100° C. and atmospheric pressure.

The oil from the heater 18 collects in the zone A of the deodoriser at such a rate that a batch of suitable size for deodorising is collected by the time that the deodorising zone B is ready to receive it.

Each batch of oil in the deodorising zone B is deodorised by stripping with steam under vacuum, the deodoriser vessel 10 being continuously exhausted through the duct 19 for this purpose. When a batch of oil in the zone B has been treated a drop valve 20 connecting zone B with zone C is opened and the charge of oil drops rapidly and completely into zone C. The drop valve 20 then closes whereupon a drop valve 21 connecting the zone A with the zone B opens to permit the charge of oil in zone A to be transferred rapidly into the deodorising zone B until the level in zone A reaches a pre-determined low level when the valve 21 closes to separate the zone A from the zone B.

The oil in the lower zone C is at deodoriser temperature and as we have seen is pumped continuously and at a controlled rate to the heat exchanger 15 where it is cooled by heat exchange with the ingoing oil.

From the above it will be understood that oil is pumped through the heat exchanger 15 at a substantially constant rate emabling it to operate in an efficient counter-current manner even though the deodorising zone B of the apparatus operates on a semi-continuous batch basis.

When it is desired to change the type of feed the deaerator 12 can be pumped substantially dry in readiness for receipt of a new kind of feed. The heat exchanger 15 is mounted at a greater height than the oil heater 18 whereby the heat exchanger can be drained into the oil heater and a drain valve 27 is provided to enable the oil heater to be drained completely into the deodoriser zone B.

It will be appreciated that it is not intended to limit the invention to the above example only, many variations, such as might readily occur to one skilled in the art, being possible without departing from the scope thereof.

What is claimed is:

1. A semi-continuous deodoriser comprising a vessel divided into three zones, means for collecting oil to be deodorised in the first zone, means for transferring oil from said first zone to said second zone and means for deodorising oil in the second zone and means for receiving and holding deodorised oil from the second zone in the third zone, means for passing oil continuously to the first zone and withdrawing deodorised oil continuously from the third zone, means for pre-heating the oil to be fed to the first zone by heat exchange with oil from the third zone, means for heating said pre-heated oil to full process temperatures in said first zone prior to transferring it to said second zone comprising oil heating means connected to receive said preheated oil, and means for recirculating the oil through said oil heating means and through said first zone comprising oil flow passages interconnecting said oil heating means and said first zone to provide a recirculation circuit and means for introducing a motive gas effectively under pressure into said circuit.

2. A semi-continuous deodoriser according to claim 1, wherein said means for heating the oil to full process temperatures comprises an oil heater flow-connected to the first zone for recirculation, and said recirculation means comprising means injecting said motive gas into the oil heater at its base thus continuously to circulate oil through the oil heater and through said first zone during heating of the oil to the desired process temperature.

3. A semi-continuous deodoriser according to claim 1, wherein said pre-heating means comprises a heat exchanger through which oil passes continuously at a substantially constant rate during passage to the first zone, deodorised oil leaving said third zone being pumped continuously and at a controlled rate to the heat exchanger where it is cooled by counter current heat exchange with the in-going oil.

4. A semi-continuous deodoriser according to claim 1, including a deaerator through which oil is fed to the first zone, and means in the deaerator to maintain a constant level of oil therein.

5. A semi-continuous deodoriser according to claim 1, wherein valves are provided between the three zones of the vessel and means are associated with said valves and arranged to transfer deodorised oil from the second zone to the third zone prior to transferring heated oil from the first zone into the second zone, means being provided to sense a pre-determined low level of oil in the first zone and to cause closure of the valve between the first and second zones.

6. A semi-continuous deodoriser according to claim 2 including means for draining the contents of the oil heater directly into the second zone.

7. A semi-continuous deodoriser according to claim 1, wherein the injected gas is steam.

8. A semi-continuous deodoriser as defined in claim 1, wherein said motive gas is introduced into said oil heating means.

9. A semi-continuous deodoriser according to claim 8, wherein said oil heater comprises a heat exchange unit connected to be heated from an external source, said preheated oil is introduced below said unit, and said motive gas is also introduced below said unit for imparting direct circulatory movement to force said oil through said heat exchange unit and said first zone.

* * * * *